358-69. OR 3,564,121 SR

/ 6532

United States Patent [11] 3,564,121

[72] Inventor David M. Goodman
3843, Debra Court, Seaford, N.Y.

[21] Appl. No. 488,017
[22] Filed Sept. 17, 1965
[45] Patented Feb. 16, 1971

[54] SYSTEMS FOR MODULATION OF BEAM-INDEX COLOR CATHODE RAY TUBES, AND THE LIKE
32 Claims, 17 Drawing Figs.

[52] U.S. Cl. 178/5.4, 313/89
[51] Int. Cl. H04n 9/28; H01j 29/10
[50] Field of Search 178/5.4 (F); 313/89, 91

[56] References Cited
UNITED STATES PATENTS

| | | | |
|---|---|---|---|
| 2,771,503 | 11/1956 | Schwartz | 178/5.4 |
| 2,785,221 | 3/1957 | Carpenter | 178/5.4 |
| 2,837,687 | 6/1958 | Thompson et al. | 315/10 |
| 2,896,016 | 7/1959 | Thompson | 178/5.4 |
| 2,897,398 | 7/1959 | Goodman | 315/10 |
| 2,917,571 | 12/1959 | Schwartz | 178/5.4 |
| 3,081,414 | 3/1963 | Goodman | 315/10 |

*Primary Examiner*—Richard Murray
*Assistant Examiner*—John Martin

ABSTRACT: A rear-ported beam index color cathode ray tube is described with a plurality of means for accurately controlling the modulation applied to the electrodes thereof in order to control the quality of data presented on the tube. Electrical and optical means are described which improve the signal to noise ratio in the index signal deriving section of the receiver. This improvement is achieved via the individual and collective action of (1) target screens having low x-ray emitting and high x-ray emitting index strips, and (2) large area scintillators for detecting and filtering the index radiation, and (3) electrical circuit means for generating synchronizing signals which respond to selected portions of the index radiation and (4) timing circuits for sequentially enabling the development of the synchronizing signals, and (5) circuit means which respond to the input data signals, deflection signals, and the synchronizing signals to precisely control the waveshapes of modulating signals applied to the cathode ray tube.

PATENTED FEB 16 1971 3,564,121

INVENTOR.
David M. Goodman
BY
ATTORNEY

INVENTOR.
David M. Goodman
BY [signature]
ATTORNEY

INVENTOR.
David M. Goodman
BY
ATTORNEY

INVENTOR.
David M. Goodman

BY [signature]
ATTORNEY

SYSTEMS FOR MODULATION OF BEAM-INDEX COLOR CATHODE RAY TUBES, AND THE LIKE

CROSS-REFERENCE TO RELATED APPLICATIONS

Reference is made herein to applicant's copending application Ser. No. 345,197 filed Feb. 17, 1964 which in turn is an improvement on applicant's Ser. No. 212,612 filed Jul. 26, 1962, now abandoned, and refiled as a continuation application Ser. No. 562,031 on Jun. 2, 1966. Application Ser. No. 212,612 was an improvement on applicant's then copending application Ser. No. 800,854 filed Mar. 20, 1959 now U.S. Pat. No. 3,081,414 granted Mar. 12, 1963. Said Ser. No. 800,854 was a continuation-in-part on applicant's Ser. No. 522,609 filed Jul. 18, 1955 now U.S. Pat. No. 2,897,388 granted Jul. 28, 1959.

Reference is also made herein to applicant's then copending application Ser. No. 163,122 filed Dec. 29, 1961 now U.S. Pat. No. 3,207,945 granted Sept. 21, 1965. Ser. No. 163,122 was a division of applicant's Ser. No. 800,854 referenced in the preceding paragraph. Also divided from Ser. No. 800,854 and copending at the time of filing this application was applicant's Ser. No. 257,335 filed Feb. 8, 1963 now U.S. Pat. No. 3,277,235 granted Oct. 4, 1966. Said Ser. No. 800,854 was also a continuation-in-part on applicant's Ser. No. 448,039 filed Aug. 5, 1954 now U.S. Pat. 2,897,398 granted Jul. 28, 1959.

This invention relates to multicolor display systems. In particular, it relates to improved methods and means for modulating beam index color cathode ray tubes so as to increase the brightness of the image which they can display.

In the use of color cathode ray tubes, the quality of the image that is developed on the target screen represents a compromise between many factors which generically apply to almost all display systems. These compromises influence the design of both the color tube and the receiver in which it is employed. Four of the most important and well known factors that determine picture quality are (1) brightness (2) resolution (3) color purity and (4) geometric distortion. In color cathode ray tube systems of the line screen beam indexing variety, these four performance factors primarily are controlled by the high voltage applied to the target screen, the size of the screen, the scan rate, the spot size of the scanning electron beam, the width of the color strips on the target screen, and by the linearity of scan of the electron beam.

It will be shown in the description of this invention which follows that the foregoing performance factors can be substantially improved by having the electron beam of a cathode ray tube controlled in a special way. In particular, it will be demonstrated that the video modulation applied to the electron gun can have an optimum rise time and an optimum fall time to compensate for the scanning motion of the electron beam, thereby to increase the brightness of the display. It will also be demonstrated that a further increase in brightness can be achieved by admitting an acceptable amount of color degradation.

To explain the foregoing, a series of time, distance, and waveform relationships will be set forth between the scanning electron beam, index strips of the target screen, index radiation, and trigger pulses derivable therefrom. It will be shown that a high speed index pulse can be split to obtain a trigger pulse independent of the growth or shrinkage in spot size.

Furthermore, the following disclosure combines in a color display system other noteworthy desirable improvement features such as pulse to pulse range-gating of the index signal, dynamic pulse width modulation of the video sampled data, and a form of "on-off" control of the index circuitry which is substantially less complicated than AVC index circuitry heretofore proposed.

Accordingly, it is the primary object of this invention to provide new and improved methods and means, which are relatively simple and inexpensive, for modulating beam index color cathode ray tubes.

It is another object of this invention to provide improved high speed beam index circuitry which may be used to achieve the foregoing objective.

And another object of this invention is to provide novel means for measuring the spot size of a scanning electron beam at the target screen of a cathode ray tube.

The manner in which these objectives are accomplished is set forth in the following description taken in conjunction with the drawings, wherein.

SYSTEM DESCRIPTION

Figure 1:
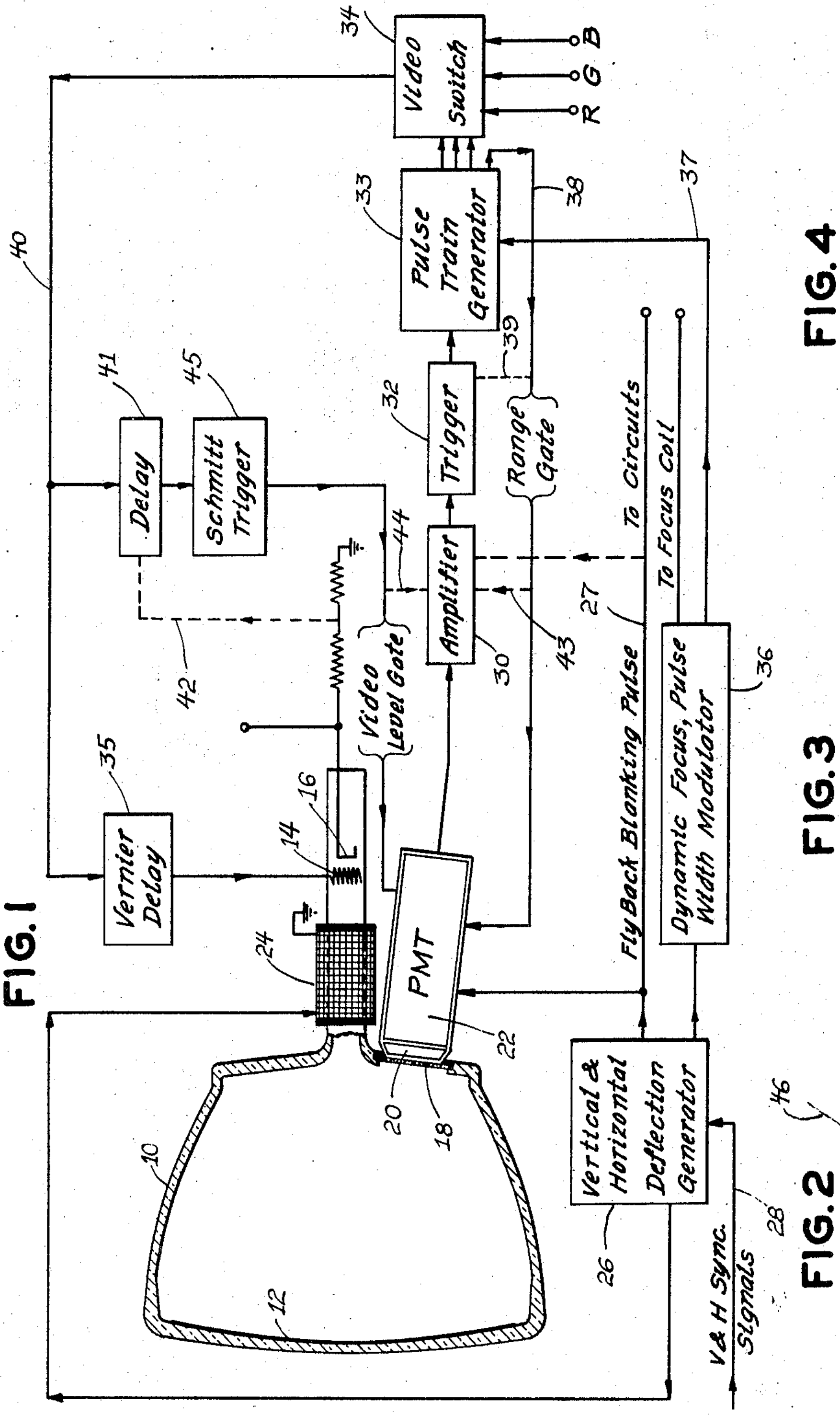
FIG. 1 is a block diagram which illustrates the basic configuration of the display tube, the index detector, the deflection circuitry, and the modulation circuitry.

In FIG. 1, cathode ray tube 10 has a target anode 12 of the line screen variety, grid electrode 14 and cathode electrode 16 of the electron gun, and a thin (.020 inch) beryllium window 18 in the rear section of the envelope of the cathode ray tube, hereinafter designated CRT. High speed scintillator 20 is positioned adjacent the beryllium window, and photomultiplier 22 is positioned adjacent the scintillator to pick up radiation emanating therefrom. Deflection coils 24 are positioned about the neck of the CRT to deflect the electron beam. The deflection voltages are furnished by deflection generator 26 which is synchronized by signals 28. Also furnished by deflection generator 26 is the flyback blanking pulse 27, and the input to dynamic focus generator 36. Pulse 27 is used to eliminate the retrace lines and the dynamic focus signal is used to maintain a more uniform spot size. The foregoing circuit features, represented by 22, 24, 26, and 36, are well known and therefore do not require detailed description.

In operation, the scanning of the electron beam across the striplike target screen 12 creates pulses of electromagnetic radiation which are used for indexing purposes. As will be further described with respect to FIGS. 5—7, in one mode of operation the target screen 12 generates x-ray index signals which are transmitted through beryllium window 18 to strike scintillator 20, thereby to produce light flashes that activate photomultiplier (PMT) 22. The output of PMT 22 feeds amplifier 30, and trigger generator 32 thereby producing a group of pulses in 33 which samples the red, green, and blue video signals in video switch 34. The sampled video signals are delayed in 35 and modulate the grid 14 of the electron gun. And the operation of the system so far is in accordance with previously described techniques.

The first system improvement relates to dynamic focus generator 36 which is used to maintain a more uniform focus of the electron beam as it scans across the target screen. It usually happens that the correction applied by the dynamic focus coil, or electrode, although beneficial is still not sufficient to maintain a constant spot size of the electron beam. Therefore, in this invention, pulse width control signals 37 are also derived from the dynamic focus generator 36. These control signals 37 are applied to pulse group generator 33 so as to reduce the time duration of the sampling pulses when the electron beam is in the corner regions of the target screen. This will reduce the brightness of the reproduced image in the corners, and carried to an extreme may produce vignetting, but the technique will both preserve color purity and maintain brightness at the central region of the screen which jointly is the more important consideration. For details on a dynamic focus circuit reference is made to Brooks U.S. Pat. No. 3,177,396 issued Apr. 6, 1965.

Another system modification relates to range gate 38 which is applied to PMT 22. The range gate turns the PMT "on" by applying voltages to selected dynodes thereof only when an index pulse is expected. This serves the purpose of reducing the effects of noise or other extraneous signals on the index triggering circuits, and will be described more fully with respect to the timing diagram of FIG. 7. Another circuit to protect the integrity of the index trigger circuitry makes use of Schmitt Trigger 45. Thus, CRT beam modulating signals routed via path 40 from video switch 34 are delayed in 41 and applied to Schmitt Trigger 45. The output of 45, designated "-video level gate," is adjusted to cut off the PMT whenever the video level exceeds a given magnitude. This leaves the PMT "on" only when the video signals are at a level proper for processing the index radiation.

In an alternate mode of operation of the "video level gate," the cathode current of the CRT is used to set the level at which the PMT is cut off. Thus, the current from cathode 16 is applied via path 42 and delay 41 to activate Schmitt Trigger 45. The delay time set by element 41 in this case is slightly less than that required when the "video level gate" is derived from path 40 but in either case the delay is selected to compensate for transit time delays (electron beam in the CRT, the electron stream in the PMT, and circuit delays). As noted in my U.S. Patent No. 3,081,414 of Mar. 12, 1963 these delays should all be as small as possible to tighten control of the system. Another useful circuit connection for both the range gate and the "video level gate" is shown at path 43 and 44, respectively, where the gate signals are applied to amplifier 30 rather than to the dynodes of the PMT 22. This permits the gates to function with lower operating voltages. Still another circuit alternative is to derive the trigger voltage for pulse group generator 33 directly from the PMT or its equivalent thereby eliminating amplifier 30 and/or trigger 32.

THE SCINTILLATOR-DETECTOR

The index radiation detector 20 of FIG. 1 is made of a suitable scintillator with its sides tapered to enhance the collection by the PMT 22 of the light generated in the scintillator in response to excitation by the index radiation. For example, with x-ray index signals produced by a 30kv target screen in a 16 inch tube, and a .020 inch Beryllium window of 2 inch diameter, it has been found that a one-fourth inch thick plastic scintillator will provide a reasonably good signal. An aluminum layer .0001 inch thick may be placed adjacent the scintillator near the window to reflect additional light into the PMT. As will be seen, the fast decay of the plastic scintillators coupled with the fast decay of the x-ray index radiation provides advantages and flexibility in design which are highly desirable.

Figure 2:
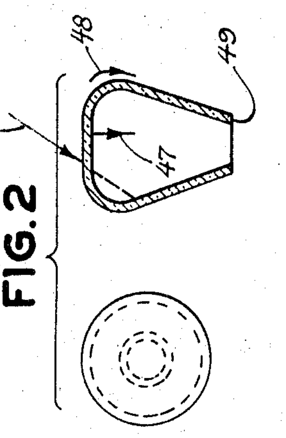
FIG. 2 illustrates a plastic scintillator and light pipe which may be used to detect index pulses generated by the target screen in the display tube.

In FIG. 2, an alternate configuration of the scintillator 20 is illustrated. This scintillator is molded into the shape of a brandy glass to expose a greater volume of scintillator to the x-radiation, and to collect the light generated by the scintillation process which would be lost through the sidewalls of a flat detector. Thus, x-rays travelling along path 46 strike the base of the scintillator and then may strike the sidewall as well as shown by the dotted lines. Also, in addition to the light emitted at 47 the light transmitted parallel to the base and interior thereof will be light piped as indicated by numeral 48 to increase the total light output at exit 49.

Figure 3:
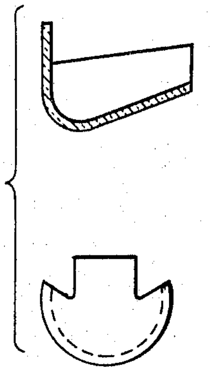
FIG. 3 illustrates an index detector akin to that in FIG. 2 but with a sidewall construction that permits closer assembly of both the scintillator and deflection coils to the neck and funnel of the display tube.

In FIG. 3, a scintillator-detector akin to that of FIG. 2 has a portion of its sidewall removed to permit closer nesting and packaging of the scintillator and the window 18, PMT 22, and deflection coil assembly 24 of FIG. 1. This is important because good sweep linearity, focusing, high voltage insulation, etc., requires careful positioning of these components.

Figure 4:
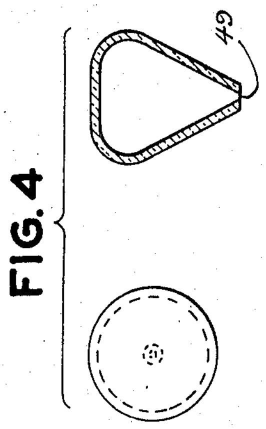
FIG. 4 illustrates a radiation detector akin to that of FIG. 2 but with a more compact exit terminal.

In FIG. 4, a scintillator-detector is provided akin to that of FIG. 2 but with its exit region 49 reduced in area. This small exit area is advantageous in that it permits the use of a smaller PMT; or in that it permits the use of photodiodes or other detectors as alternatives to the photomultiplier tube.

Figures 9, 10, 11, 12, 13, 16, 17:
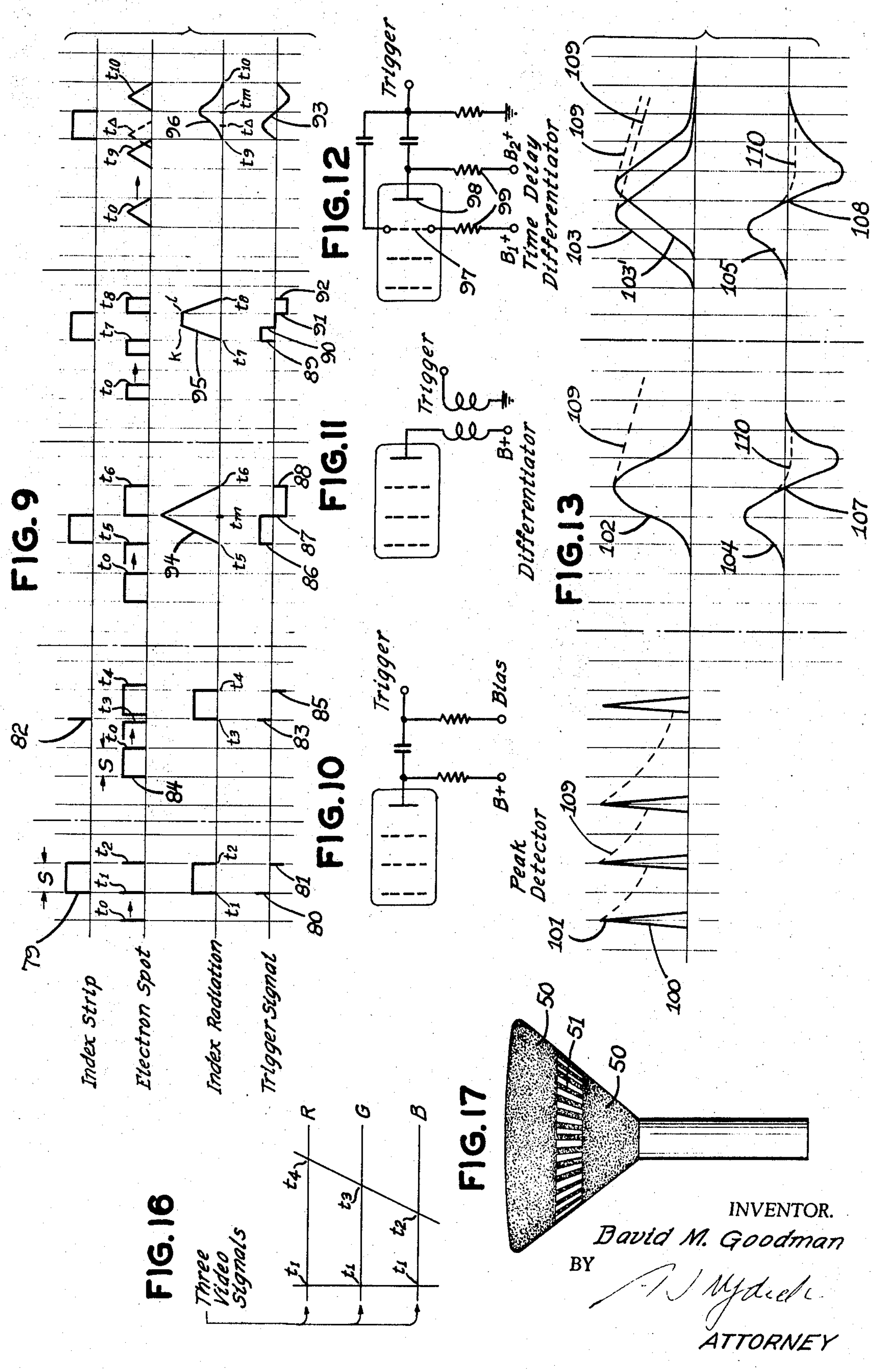
FIG. 9 illustrates five different sets of timing waveforms of the electron beam, the index radiation, and the index-derived trigger signal taken with respect to the index strip of the target screen.
FIG. 10 is a partial schematic drawing of a peak or leading edge detector for providing a trigger signal.
FIG. 11 is a partial schematic drawing of a circuit which takes the timed derivation of the index signal.
FIG. 12 is a partial schematic drawing of a circuit akin to that of FIG. 11 but which uses time delay differentiation.
FIG. 13 illustrates timing waveforms for the circuits of FIGS. 10—12.
FIG. 16 is a timing diagram which represents two ways of sampling red, green, and blue input signals.
FIG. 17 is a view of a cathode ray tube with a special window for transmitting an increased amount of electromagnetic index radiation.

Regardless of the precise nature of the index radiation, be it in the x-ray region or in the near ultraviolet region of the spectrum or elsewhere, it is generally desirable to pick up as much radiation from the target screen as is practical. With a beryllium window of 2 inch diameter located substantially as shown in FIG. 1 in a tube whose useful faceplate diameter is 16 inches, only 0.17 percent of the x-radiation from the target screen is intercepted. An arrangement which provides substantially more interception of the index radiation from the target screen, and which is better suited to the detection of index radiation provided by P-16 type phosphors, is illustrated in FIG. 17. In that FIG., Aquadag coating 50 (conventionally deposited on the interior funnel portion of CRT envelopes) has a special comblike pattern wherein the teeth or strips 51 of Aquadag typically may be 2 inches long, .025 in median width, and spaced on .25 inch centers. This configuration of the internal conductive coating preserves the uniformity of the electric fields within the tube envelope while at the same time permitting the transmission of practically 90 percent of the index radiation striking the 2 inch circumferential region. To collect this radiation a plastic scintillator strip, 2 inches wide, is placed about the combed or toothed section of the tube envelope. Plastic phosphor NE 102 obtainable from Nuclear Enterprises in Winnipeg, Canada is ideally suited for this purpose. See also Hyman U.S. Pat. 2,710,284 and Review of Scientific Instrument, Vol. 33, No. 7, Jul. 1962, pp. 274—5. It scintillates brightly in response to ultraviolet excitation from the P-16 phosphor, whereas scintillation was not observed when excited by the visible blue from a P-11 phosphor. For a description of the properties of phosphors P-11, P-16, and others, see JEDEC Publication No. 16, Jun. 1960, entitled "Optical Properties of Cathode Ray Tube Screens" available from the trade association EIA (Electronic Industries Association). In other words, the plastic scintillator simultaneously acts as an ultra-violet index radiation detector and as a visible "light rejection" filter. Further details on index signal generation and detection, transmission of scintillation energy, etc., is contained in my copending application Ser. No. 345,197 filed Feb. 17, 1964 which is incorporated herein by reference.

TARGET SCREENS AND BASIC TIMING DIAGRAM

Figure 5:
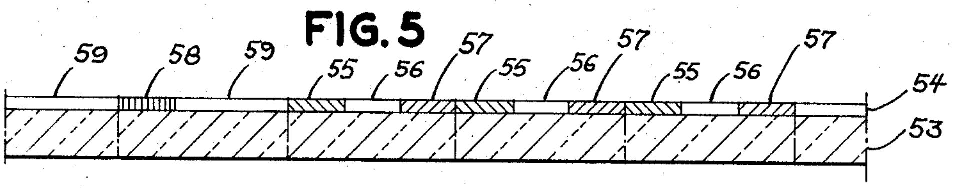
FIG. 5 illustrates a cross section of a target screen of the display tube.

In FIG. 5, a glass substrate 53 has a line screen 54 comprised of green phosphor strip 55, red phosphor strip 56, and blue phosphor strip 57. The strips are presented as equal in width for ease of description and they are arranged in repeating groups across the screen. Their disposition in the CRT is such that the scanning electron beam crosses the strips in sequence from left to right. A "run-in" x-ray producing index strip 58 precedes the color producing strips. Aluminum layers or meshes or other electrical conductive coatings that may be used are not shown. Since x-ray production as a consequence of electron beam bombardment is directly proportional to the atomic number, it is desirable to emphasize the difference between atomic numbers of index and nonindex areas. Accordingly, the feature of interest in this target screen is that the run-in strip 58 is made of a substance with a high atomic number Z such as a tungsten, or with a high effective atomic number such as thorium oxide; and that it is surrounded by a region 59 of low atomic number such as carbon, or boron carbide. In this way a Z-ratio as high as 74/6 (tungsten to carbon) can be realized between the "run-in" index strip and the nonindex area.

It should be noted that when an aluminum layer is used it will not excessively disturb the Z-ratio of the phosphor strips because the thickness of the aluminum (Z=3) is minimal and relatively few electrons will be stopped or braked therein.

Figure 6:
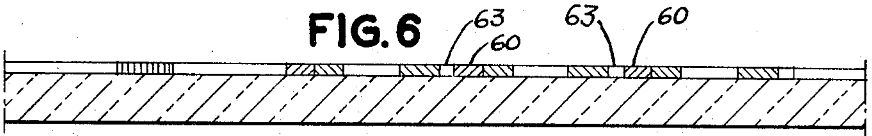
FIG. 6 illustrates a cross section of another target screen.

In FIG. 6, the target screen is akin to that of FIG. 5 except that the green phosphor strip 55 is provided with a high Z index region 60, and the blue phosphor strip 57 is provided with a low Z index region 63. Typically, in a CRT with 600 vertical color strips and 18 inches of useful width, each strip 55, 56, 57 is .030 inch wide. The high Z region 60 may have a width of 15 mils; the low Z region a width of 5 mils. This configuration takes advantage of the high efficiency of the green phosphor and its placement in the triad; and it takes advantage of the higher Z-ratio obtainable with low Z substances such as carbon. Thus, in this screen, some of the useful area is set aside for crispness of index signal generation.

Figure 7:
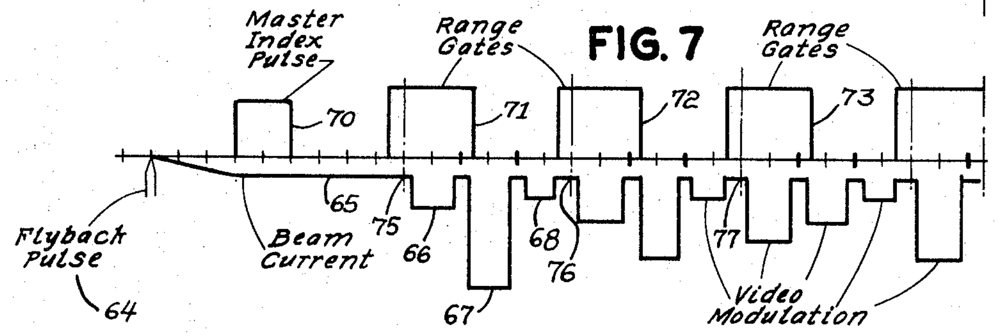
FIG. 7 represents a timing diagram indicative of the relationship between the target screen, the electron beam, the video modulation, the index pulses, and the range gates.

The manner in which these target screens are used is now described by taking the screen of FIG. 5 in conjunction with the timing diagram of FIG. 7 wherein the variation in electron beam current is shown as the beam scans across a target screen akin to that of FIG. 5. A linear sweep is presumed so that the abscissa of the drawing represents either a time base or a distance on the target screen. Also, the target screen is used as a reference for the timing diagram because proper adjustment for all the transit time delays in the system makes this the most convenient thing to do. Thus, in operation, flyback pulse 64 resets the beam current to its residual level 65. It may be assumed that the scanning beam was cut off during the retrace interval, as is customary practice. As the scanning action commences, the intensity of the electron beam increases as depicted in intervals at 66, 67, and 68 to reflect the varying magnitude of excitation of the different color producing strips. These excitation intervals can be variable and are designed to excite less than the full width of the color strips, as previously disclosed in my U.S. Pat. No. 3,207,945 of Sept. 21, 1965.

At the start of the scan, the "run-in" index strip 58 generates an initial pulse of index radiation 70. This master index pulse (and other pulses in FIG. 7) are illustrated with instantaneous rise and decay times. This condition is not usually met in practice, as will be discussed later with reference to FIGS. 14 and 15, but it will be considered so for the purpose at hand. Thus, pulse 70 consists of a burst of x-rays which penetrate the beryllium window in the CRT, excite the scintillator, and subsequently trigger a group of four pulses. Three of these pulses are used to sample the three video signals; the fourth pulse is used to generate the range gate 71. Advantageously, range gate 71 is shaped to have a duration slightly greater than the time it takes for the electron beam to cross the index containing strip 55, and the range gate is derived with a minimum useful time delay. Thus, range gate 72 is derived from an index pulse occurring in the interval covered by gate 71; gate 73 is derived from an index pulse occurring in the interval covered by gate 72; etc. This means, insofar as FIG. 5 is concerned, that the range gate overlaps the green sampling pulse and can be derived therefrom. As explained previously, the purpose of the range gate is to activate the index circuitry in a way which minimizes the adverse effects of noise, video modulation, etc. For a more detailed explanation of these advantages reference is made to U.S. Pat. No. 3,201,510 to Davidse issued Aug. 17, 1965.

For the target screen of FIG. 5 which has relatively wide index strips, the triggering pulse preferably is derived from the leading edge of the pulse of index radiation. This corresponds to the points designated 75, 76, and 77. It will be noted that at these points the index circuitry is made operative by the range gates 71, 72, 73 and that the beam current has returned to its residual level 65. As a consequence, the trigger (element 32 of FIG. 1) is designed to respond to the increase in index level which is experienced when the electron beam leaves phosphor strip 57 and enters strip 55. Since the residual current of the beam is fixed in amplitude this increase in index level is a direct function of the Z-ratio between these two strips. The sensitivity of the trigger to input amplitude changes determines the phosphors of choice and the extent to which they are diluted with high Z and low Z materials.

In the event that it is desired to enhance the jump in x-radiation as the leading edge of an index strip is traversed the target screen of FIG. 6 may be used. In this configuration region 63 (which is made of carbon or other low Z material) replaces part of strip 57, and region 60 (which is made of tungsten or other high Z material) replaces part of strip 55.

Another mode of extracting the index signal makes use of the fact that a greater range in useful effective atomic numbers is made available by using a low Z strip for indexing rather than a high Z strip. Thus, if the phosphor strip 57 has an effective Z of 37 then by using tungsten as an index strip with a Z of 74 a Z-ratio of 2.1 is provided. Using uranium with a Z of 92 as an index strip yields a Z-ratio of 2.5:1. On the other hand, using a low Z index material such as carbon with a Z of 6 yields a Z-ratio of 37/6 or better than 6:1. To use the low Z index strip, the trigger circuit 32 is designed to respond to a negative going portion of the index radiation, or to the central portion thereof. This mode of operation requires that the index signal be well out of the noise region, which in turn requires either a high residual beam current or good index radiation collection.

A wide range of silicate and sulfide phosphors and numerous compatible additives are available for regulating the Z-ratio, and in this connection reference is made to Air Force Report RADC–TDR–65–112 where some measured results are published.

VIDEO LEVEL GATE

In a high quality entertainment type television receiver with good deflection linearity, a good signal to noise ratio in the index signal, and a range gate, the trigger circuit 32 of FIG. 1 can be designed to respond to a Z-ratio as low as 1.2 to 1. In a less expensive receiver, however, where the timing circuits, the sweep circuits, deflection sensitivity, etc., may be subject to uncontrolled variation it is desirable to further protect the functioning of the index circuitry. In particular, if the electron beam current has not reached its residual level when it enters an index strip, due to the effect of unwanted video modulation or noise pulses on the beam, it may inadvertently and prematurely energize the trigger circuit thereby pulling the system temporarily out of synchronization. To help prevent this loss of synchronization from happening due to video cross-modulation of the electron beam the index circuitry is deactivated when the video modulation on the electron beam is large enough to make the x-radiation appear as though it is coming from a high Z strip when in fact it is coming from a low Z strip.

Thus, in FIG. 1, the sampled video signals arriving in path 40 are delayed in 41 and then applied to Schmitt Trigger 45. With no video applied, the Schmitt Trigger is adjusted so that the "-video level gate" provides operating voltages for the PMT 22 (or amplifier 30). When these video signals are present and are large enough to increase the residual beam current by a factor equal to or greater than the Z-ratio, then the Schmitt Trigger reverses its state, no longer provides operating voltages and PMT 22 is cut off. This achieves the desired result of permitting the index signal to pass through the PMT only when it is free of excessive video cross-modulation.

When the foregoing "video level gate" feature is used, the flyback blanking pulse 27 should be in circuit with means for disabling the video signals, or it should lock out the reverse state of the Schmitt Trigger, until the master index pulse has been derived. Circuit details for achieving these modifications are considered trivial and are not illustrated.

DEFLECTION LINEARITY REQUIREMENTS

Figure 8:
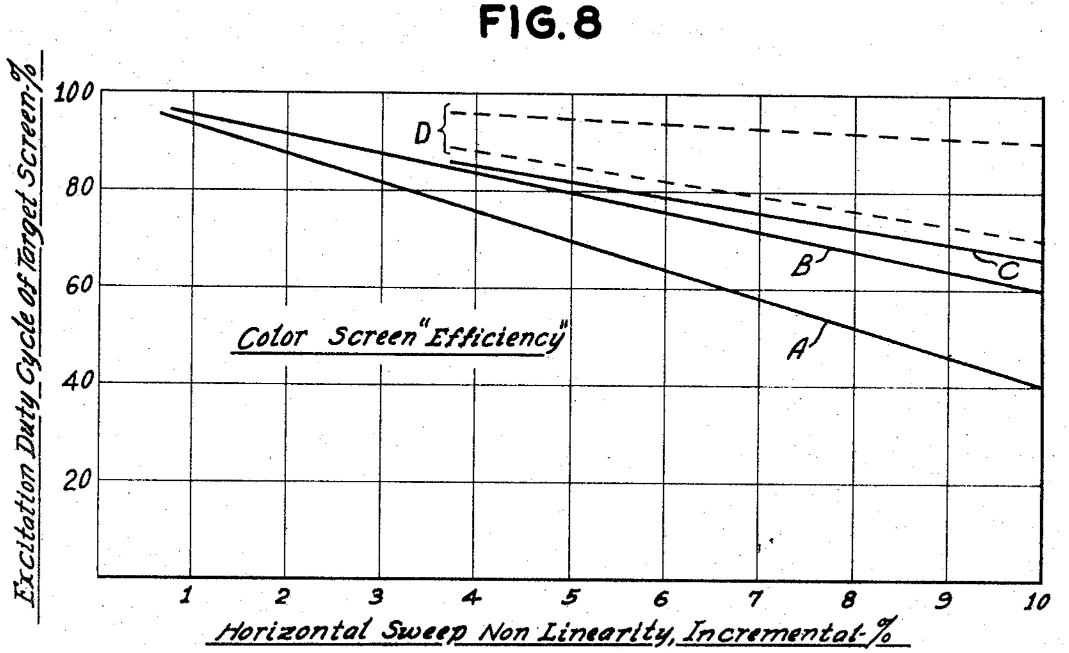
FIG. 8 is a graph which shows the relationship between horizontal scanning nonlinearity and permissible excitation duty cycle of the target screen.

In FIG. 8, a graph is charted which shows the percentage of the target screen area which can be excited by the scanning beam without introducing color distortion. The curves A—D represent various ways of achieving an "electronic guard band" but all curves imply a scanning beam with a spot size much less than a phosphor strip width . The underlying basis for these curves is contained in aforesaid U.S. Pat. No. 3,207,745. From curve A, it is seen that with 10 percent horizontal nonlinearity it still is possible to excite 40 percent of the target screen. At 2 percent nonlinearity the excitable region of the target screen increases to 88 percent. Curve A represents the theoretical data derived using three exciting intervals of equal widths, and three adjacent equal width color producing strips. Curve B represents an improvement over curve A in that the exciting intervals vary so that the "electronic guard bands" are made larger in going from the first exciting pulse to the last exciting pulse in a given pulse train. Thus, curve B represents the data for three exciting pulses of optimum durations on equal width strips. In this case at 10 percent nonlinearity, 60 percent of the screen can be used; at 2 percent nonlinearity, 92 percent of the screen can be used. Comparing curves A & B at the 5 percent nonlinearity point, it is seen that curve A indicates 70 percent of the target screen can be used whereas curve B indicates this percentage can be increased to 80 percent.

Still further improvement in the useable area of the screen is evidenced by curve C which represents theoretical data in which the "electronic guard band" at the front of a strip is slightly less than that at the rear of the same strip; and in the two curves D which represent a separate index signal for each index strip, one curve with and one curve without the effects of a delay approximately equal to one strip width. It is to be noted, however, that the law of diminishing returns sets in with only minor improvements being yielded by curves C and D. This may be best appreciated by observing that as the sweep linearity improves all the curves approach each other, until at the 1 percent nonlinearity point the minimum useable screen area is 94 percent regardless of the mode of operation. Hence, a sweep with an incremental nonlinearity of less than 1 percent may be considered to provide a linear time base.

TIMING OF TRIGGER SIGNAL

In FIG. 9 there are illustrated timing diagrams of five different methods for deriving a trigger signal which is used to synchronize the group or train of video sampling pulses. The horizontal abscissas represent the stationary index strip, and the time varying electron beam, index radiation, and trigger signal respectively. Thus:

1. At the left most column of FIG. 9 is shown as index strip 79, much wider than the fine electron spot which is shown beginning its scanning action at time $t_0$. At time $t_1$, the electron spot impinges upon the strip 79 and x-radiation is emitted for indexing purposes. This index radiation continues until time $t_2$ when the electron spot stops striking the index strip 79. Thus a rectangular pulse of index radiation is generated. Trigger signal 80 may then be obtained from the leading edge of the pulse, and trigger signal 81 from the trailing edge.

2. In the next column, index strip 82 is made very thin and the electron spot 84 takes on a rectangular form. Scanning action starts at time $t_0$. At time $t_3$, the spot and strip coincide so that index radiation is generated. This continues until time $t_4$ when the spot leaves the strip 82. Trigger signals 83 and 85 are derived from the leading and trailing edges, respectively, of the rectangle pulse of index radiation. Since the strip 79 and electron spot 84 have the same dimension S, the pulses of index radiation are of equal duration, and the triggers 80 and 81 occur at the same time as 83 and 85.

3. In the third column, the index strip and the scanning beam have equal dimensions. The index radiation that results from this scanning process is depicted to start at time $t_5$, reaches a maximum intensity at time $t_m$ when the spot and strip coincide, and diminishes to zero at time $t_6$ when the trailing edge of the scanning beam leaves the index strip. Trigger signals 86, 87, and 88 may be derived from the discontinuities at times $t_5$, $t_m$, and $td$ 6 in well known fashion. The energy peak at $t_m$ is maximum.

4. In the fourth column the electron spot, originating at time $t_0$ is smaller than the index strip but of sufficient width to be taken into account. The resultant index radiation starts at time $t_7$, reaches a maximum at point $k$ when the electron spot is fully on the index strip, starts to decay at point $l$ when the spot starts to leave the strip, and reaches zero at time $t_8$ when the electron spot leaves the index strip. From this arrangement, trigger pulses may be derived at the discontinuities identified as 89, 90, 91, and 92.

5. In the last column, the index strip is scanned by an electron spot of triangular waveform to yield index radiation starting at time $t_9$ and ending at time $t_{10}$. Differentiating this waveform yields a trigger signal 93 which has five useable trigger points.

The purpose of the trigger is to control on a timely basis the sampling of the signals that carry the information to be displayed. These signals can be sinusoidal in format as is customary in so-called self-decoding systems, or they can be unidirectional. In FIG. 16, the timing diagrams illustrate two sequences in which the color information can be sampled. At $t_1$ all color signals are sampled simultaneously. This technique can be used when the three colors are in unidirectional video format, including "color difference" format. Delays are introduced after sampling to take into account the scanning time of the individual color strips. At $t_2$, $t_3$, and $t_4$ successive sampling is indicated which can be used in both self-decoding and simultaneous video systems.

GENERATION OF THE TRIGGER SIGNAL

In FIG. 10, a partial schematic is drawn to typify conventional output circuitry of a photomultiplier (PMT) which is arranged to provide trigger signals responsive to the leading edge or the peak value of incoming bursts of radiation. In FIG. 11, the output from the PMT is differentiated by transformer action to provide any of the trigger signals in FIG. 9. In FIG. 12, the output of the PMT is differentiated by time delay and signal subtraction as an alternate circuit to the arrangement of FIG. 11.

In FIG. 13, waveform 100 corresponds to one shape of the index radiation generated as explained with reference to FIG. 9. As is well known, the action of the peak detector of FIG. 10 is such that a triggering signal can be provided responsive to the leading edge or to the peak region 101 of the waveshape. The waveform 102 corresponds to the output of the PMT corresponding to input index radiations when a degree of smoothing has occurred in the signal processing. The same is true of waveform 103.

Waveform 104 represents the first derivative of waveform 102. It is obtained from the circuit of FIG. 11. Waveform 105 represents the first derivative of 103. It is obtained by taking waveform 103, delaying it in time to generate waveform 103[1], and then subtracting 103[1] from 103. The circuit of FIG. 12 accomplishes this time delay differentiation inasmuch as the pulse from anode 98 is delayed in time and is of opposite polarity to the pulse obtained from dynode 97. Resistors 99 are used to balance the amplitudes of 103 and 103[1].

The plurality of trigger points provided by the foregoing configurations stems from the marked advantage of using x-rays for indexing and plastic scintillators for detection. Jointly, the x-rays and plastic scintillators have rise times in the subnanosecond range; and decay times in the order of 1—2 nanoseconds. This is decidedly faster than the fastest of indexing phosphors now available for purchase; and faster than those described in the literature which may not yet be commercially available. This high speed, nanosecond action of the instant invention makes it possible to better use the leading edge, and the peaks of the index signals. It also permits use of the trailing edge. Most important, it permits use to be made of the zeroaxis crossings 107, 108 of the differentiated index signals. This zeroaxis crossing, obtained by double differentiation or otherwise, permits accurate location of the middle of the index pulse. Reference is made to U.S. Patent No. 3,187,273 to Chasek for circuit details that may be used in carrying out this facet of the invention.

To illustrate the difficulties encountered in locating the center of the index pulse when slower responding index means are used, reference is made to waveforms 109 in FIG. 13 which represent the effects of "afterglow" of the index phosphor. In particular, reference is made to the two differentiated waveshapes 110 which indicate that with excessive "afterglow," or decay time, it becomes impossible to use the zeroaxis crossing point as a timing reference.

VARIATION OF SPOT SIZE

As should be evident from the foregoing description, and as is generally recognized in this art, the size and shape of the electron beam is an important consideration in color display devices incorporating line screen color cathode ray tubes. CRT's with electron guns and deflection systems are known to exist in which the electron beam is less than 1 mil in diameter at the target screen. Since the detail of data display available with this fine spot often is better than the eye can resolve, in some applications the effect of an infinitesimally small spot size can be successfully realized. However, the cost of achieving this fine spot size can be burdensome and it usually happens that the four and shape of the spot, and its variation with beam current and deflection defocusing, has to be taken into account.

Figure 14:
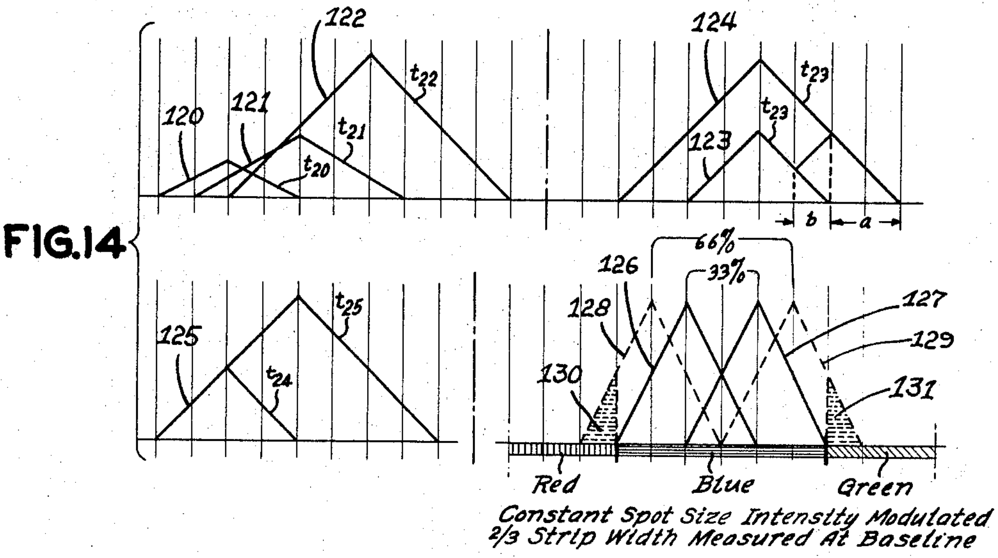
FIG. 14 illustrates four different ways in which the spot size of the electron beam can vary with beam current and with time.

In FIG. 14, triangular waveshape 120 is used to represent the effective cross section of a scanning electron beam. Although not an exact profile, the triangular shape is a reasonable approximation of the electron distribution in the beam and will be used inasmuch as it simplifies the explanation to follow. The extent of the usefulness of this simplification can be appreciated if it is pointed out that with an assumed round cross section, the passage of an electron beam at right angles to a vertical strip with parallel sides results in a mathematical analysis involving transcendental equations. The advantages of avoiding this complication should be obvious. Thus, at time $t_{20}$ the beam illustrated in FIG. 14 covers four units of distance and has a given amplitude. At time $t_{21}$ the spot has advanced, grown in amplitude, and in its size as measured at the base. At time $t_{22}$ the spot has advanced, and grows still larger as it increases in intensity. In the same FIG., waveform 123 is akin to waveform 120 in that it covers four units of distance at the base. Waveform 124, however, illustrates an increase in spot intensity, and size, which is instantaneous. Thus, the waveform shifts from 123 to 124 at time $t_{23}$. The growth in the spot from 123 to 124 can be defined by the shift in the base line, identified as *a* which is two units; or by the shift in the central portion, identified by *b* which is only one unit of distance. Carrying this interpretation further, the shift in the spot at its center is seen to be zero. All three measures of spot growth are useful. The measure selected in a given situation should depend upon the portion of the waveform which is being used for reference purposes.

A combination of the features of the rate of spot growth illustrated with respect to waveforms 120—122 and 123—124 is set forth in the waveform 125. In this case, the spot advances from $t_{24}$ to $t_{25}$ at such a speed, and the spot grows at such a rate, that the trailing edge becomes stationary. This is a desirable feature, to be discussed further with reference to FIG. 15.

In the last diagram of FIG. 14, the situation is illustrated where the spot size remains constant even though the intensity thereof increases. In this case, considerable increase in brightness can be obtained albeit at the expense of some color impurity. Thus, waveform 126 represents the position on the blue phosphor strip where the electron beam should impact with an intensity proportional to the blue video to be displayed. The same waveform at 127 is where the video modulation should be removed in order that the green region not be excited by the blue information. As measured by the shift in the peak, or center, of the waveform it is seen that the electron beam can be intensity modulated for two distance units out of a total of six. This amounts to 33 percent utilization of the complete scanning interval. Waveforms 128 and 129 are introduced to show how the interval of excitation of the blue strip can be doubled, from 33 percent to 66 percent. This may be accomplished, as illustrated in the FIGS. by permitting minor excitation of the red strip at the start of the scan of the blue strip, and by permitting minor excitation of the green strip at the end of the scan of the blue strip. The color impurity introduced to gain this improvement in brightness of the blue strip is shown in shaded areas at 130 and 131. The section 130, introducing red impurity, represents but one-eighth of the triangular waveform. Moreover, it rapidly disappears as the scan proceeds so that the red impurity rapidly is reduced to zero. The section 131 introduces a small impurity in the green but, as with the red, it is negligible with respect to the 100 percent increase in brightness achieved in the blue strip.

CONTROL OF RISE TIME OF VIDEO MODULATION

In FIG. 16, the first timing diagram is drawn with respect to a high definition color television receiver system in which the total effective horizontal scanning interval is 60$\mu$secs. The color tube is of the line screen variety with 1000 vertical color producing strips. As a consequence, the time required for scanning the blue emitting region 133 of target screen 135 is 60 nanoseconds. The scan is linear so that the time base identified in the diagram also corresponds to distance on the target screen. The width on the screen for picture development is 25 inches, and therefore the blue strip has a width of 25 mils. The residual beam current, i.e. with no video modulation, is 35$\mu$amps. The spot size at 35$\mu$amps measured at a reference base line is 12.5 mils. These figures are all fairly representative of a receiver adapted to receive NTSC signals. The waveshape of the beam is considered triangular for the reasons mentioned, and is illustrated at 137 at the start of the interval when the blue video information is to excite region 133 of the screen.

Waveform 139 represents the condition which applies when the video modulation is applied to raise instantaneously the beam current to 400$\mu$amps, the maximum blue light excitation intensity. The electron spot, it should be noted, has grown (in going from 35$\mu$amps to 400$\mu$amps) from 12.5 mils to 25 mils. As discussed with respect to waveform 128 of FIG. 14, this condition can be tolerated provided only that the introduction of some red impurity is acceptable, and provided that the instantaneous increase in beam intensity can be achieved. An alternate and sometimes more desirable mode of operation, however, can be achieved in accordance with the description of waveform 125 of FIG. 14 wherein the growth in the size of the electron beam is not instantaneous but is controlled to keep the trailing edge of the electron beam stationary.

Figure 15:
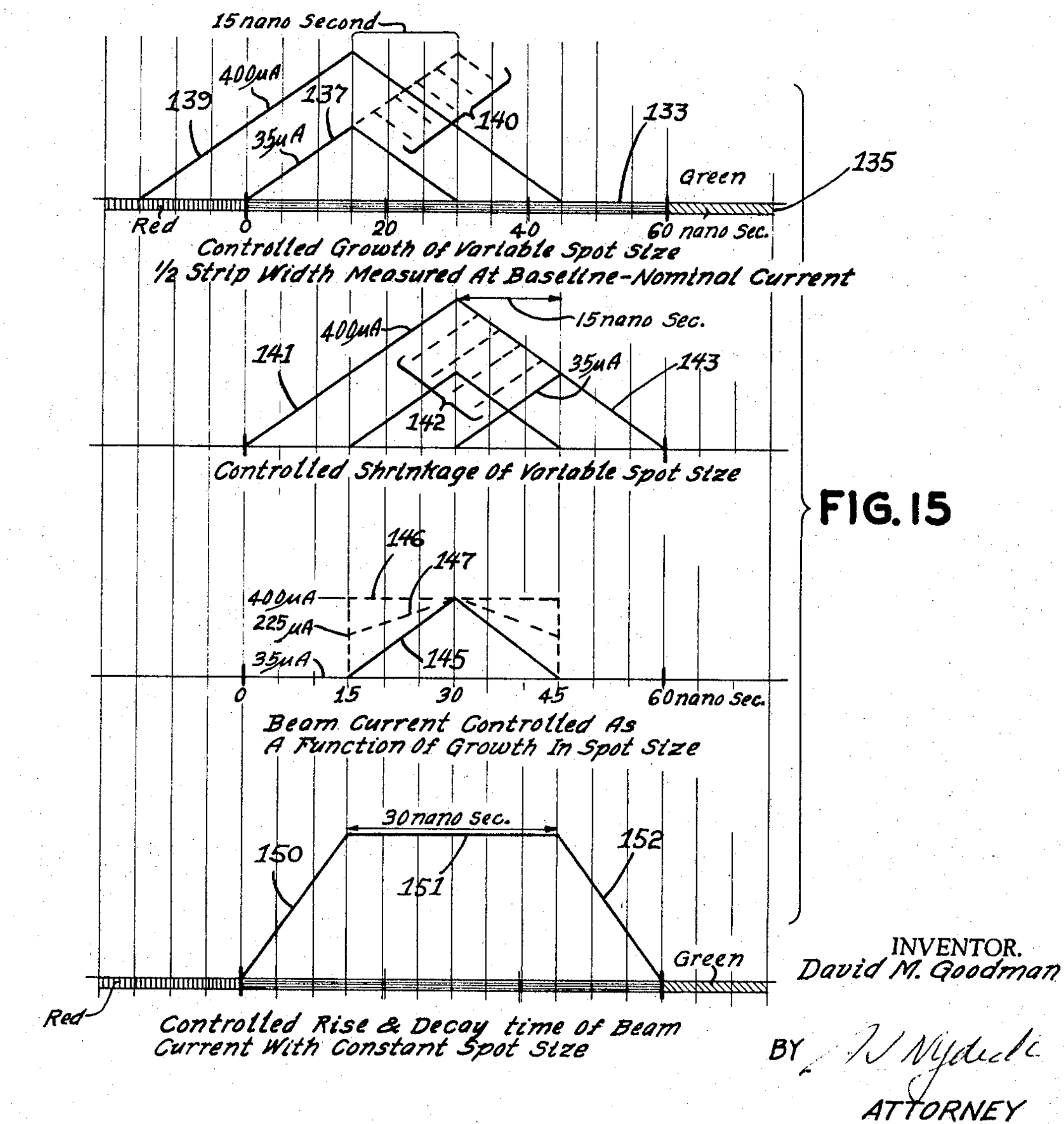
FIG. 15 illustrates results of controlling the growth in spot size of the electron beam.

Thus, in FIG. 15 waveform 137 is shown to increase in size, via dashed lines 140; so that it reaches its peak value when it is centered in the blue strip 133. In this way, although some brightness is sacrificed, no red color impurity is introduced inasmuch as the trailing edge of the beam was held stationary and did not spill into the red emitting region of the target screen. It is of much practical interest to also note that it required 15 nanoseconds for the full growth in spot size to be completed. In other words, the effective rise time of the video modulated electron beam is 15 nanoseconds. This is a practical figure which can be met by carefully designed broad-band circuits. It is a more likely condition to prevail in commercial entertainment receivers than the situation described previously in which the rise time was treated as being zero, i.e., when the spot growth was instantaneous.

It follows from what has just been said that it would also be desirable to design the fall time of the electron beam so that the leading edge thereof remains stationary at the intersection of the blue region 133 and the adjacent green emitting region when the beam intensity is reduced from its maximum value of 400$\mu$amps to its residual level of 35$\mu$amps. And this is shown via waveforms 141, 142, and 143 of the second timing diagram in FIG. 15.

MODULATION OF THE ELECTRON BEAM

The controlled growth and shrinkage of the electron spot is obtained by properly modulating the electron beam. Timing waveform 145 represents the effect of the video modulation which is applied to the electron gun of the CRT to achieve the controlled growth depicted by the transition between waveforms 137 and 140. As stated, this growth requires 15 nanoseconds. The residual level of the beam current is 35$\mu$amps. The final level is 400$\mu$amps. This increase in beam current is linear and is accompanied with a linear growth in spot size. Therefore, to a first approximation the required video modulating voltage is also linear, although the characteristics of the electron gun may vary this situation somewhat.

Rectangular waveform 146 represents an instantaneous increase in beam current, and so corresponds to the transition between waveforms 137 and 139. Spot growth transitions such as 120, 121 and 122 require a beam current growth intermediate the linear rise of 145 and the instantaneous rise 146 and may be symbolized by 147 which represents a modulated beam current for a spot which does not increase in size until a level of approximately 225$\mu$amps is reached. In all three cases (145, 146, 147) the modulation of the electron beam does not commence until the base line of the spot is entirely within the blue region; and the modulation returns the beam to its residual level before the base line extends into the adjacent green region. Therefore, for the example illustrated, the electron beam is modulated by the sampled color bearing signal for 30 nanoseconds whereas the interval for scanning the blue strip is 60 nanoseconds.

If a certain degree of color impurity can be tolerated, the technique of waveform control of FIG. 14 (126, 128, 130) can be used and this is illustrated as the last timing diagram in FIG. 15. Thus, the beam current 150 starts to rise earlier in time so that part of the spot impinges upon that red emitting strip which precedes the blue strip. The beam current reaches its peak at 15 nanoseconds, stays at that value 151 for 30 nanoseconds, and then falls via 152 to its residual level in the last 15 nanoseconds. In this case, 30 additional nanoseconds of full intensity modulation (151) is gained over the method of modulation associated with waveform 145.

It should be clear from the patents already referred to in this specification, namely, U.S. Pat. No. 3,177,396 to Brooks, U.S. Pat. No. 3,187,273 to Chasek, and U.S. Pat. No. 3,201,510 to Davidse that persons skilled in this art can readily design circuits to provide the foregoing waveforms, for modulating the beam current of the CRT. Additional references that indicate the advanced state of this art, i.e. pulse shaping, and that may be used for specific circuit details are U.S. Pat. No. 3,141,981 to Henebry of Jul. 21, 1964; U.S. Pat. No. 3,170,124 to Candilis of Feb. 16, 1965; and U.S. Pat No. 3,177,433 to Simon et al. of Apr. 6, 1965.

MEASUREMENT OF SPOT SIZE

A reexamination of the waveform and timing diagrams in FIGS. 9, 13, 14, and 15 is useful in emphasizing the role played by the size and shape of the electron beam as it varies with time and intensity. The variation in the spot with position of deflection on the raster has also been pointed out. In color cathode ray tubes other than the line screen variety, and in monochrome tubes as well, the spot size is also a major consideration so that it stands to reason that techniques have been developed for measuring the electron beam at the target screen. These techniques include scanning the luminescent spot past an external slit, making shrinking raster and other direct optical measurements, etc. There are also design techniques that have been developed for controlling spot size that include aperture masks in the electron gun, dynamic focusing, etc. It is a fortunate aspect of this invention that due to the high speed circuitry it provides, spot size measurements are reduced to the utmost in simplicity. Thus, the scanning of the electron beam across the x-ray index strip produces a time varying signal out of the photomultiplier which is a direct measure of the effective cross section of the electron beam at the target screen. From FIG. 9, it is seen that index radiation resulting from the intersection of thin index strip 82 with electron spot 84 represents the effective cross section of the spot 84. Index radiations 94, 95, and 96 can also be used to chart the shape of the electron spot. The basic requirements to be met for this measurement to be realistic is that the rise and fall of the radiation be prompt, and that its detection be prompt. These conditions are met by using x-rays for the index radiation; a fast responding x-ray detector, such as a plastic scintillator, which has a decay time of less than a few nanoseconds; and a wide band amplifier such as the newer photomultiplier tubes which also have a small transit time spread. If the index strip is thin enough (as depicted at 82) the detected index pulse yields a direct measure of the spot size. With this relatively simple technique being made available for the measurement of spot size, it becomes practical to derive experimental data which records the spot size and the change in spot size for any electron gun as a function of the modulating voltage applied thereto. This data is then used to determine which of the foregoing modes of spot control are the most suitable in a given set of circumstances.

SUMMARY

The foregoing disclosure has shown how the electron beam of a cathode ray tube can be controlled to gain a substantial increase in performance of color tubes of the line screen variety. In particular, it was shown how the rise time of the video modulation applied to the electron gun can have its rise time and fall time controlled so as to compensate for the scanning motion of the electron beam, thereby increasing the brightness of the display. It was also shown how a further increase in brightness could be achieved, admitting a minor amount of color degradation, by increasing the interval of excitation of at least one of the color strips.

The time, distance, and waveform relationships were set forth between the scanning beam, the index strips, the index radiation, and the trigger pulses derivable therefrom. It was shown how to split the index pulse to obtain a trigger pulse independent of the growth or shrinkage in spot size; it was shown how to obtain a trigger pulse from the trailing edge of the index radiation; it was shown how to accurately measure the spot size of the electron beam. In connection with these features, the advantages were pointed out of using x-rays for indexing, and plastic scintillators in the high speed detection circuitry.

It was shown how to provide a target screen with high Z-ratios, the "run-in" strip having a Z-ratio in excess of 10. It was shown how the use of a low Z strip for indexing is useful in increasing the effective Z-ratio. And improved means were shown for detecting the index radiation be they x-ray, ultraviolet, or other forms of penetrating radiation.

Additionally, it was shown how the foregoing disclosures are combined in a color receiver to provide still further desirable improvement features such as range-gating of the index signal, dynamic pulse width modulation of the sampled data, and a form of "on-off" control of the index circuitry which is substantially less complicated than AVC index circuitry heretofore proposed.

Although the most obvious application of the foregoing teachings is to the reception and display of signals in the NTSC format, it should be appreciated that other uses of this invention are contemplated in the industrial and military environment. Furthermore, the techniques of beam index control systems hereinbefore set forth are also applicable to display systems in which the electron beam is replaced by a light beam, such as from a laser, and in which the target screen responds to a scanning action by the light beam to provide both beam index and display capability. Reference is made to the aforementioned patent application Ser. No. 345,197 for a disclosure of beam index means responsive to "light" excitation.

I claim:

1. In a multicolor beam index display system comprising a source of data signals to be displayed in different colors; and image developing target screen with a plurality of strips of color producing and index signal producing elements; means for forming a scannable beam of energy; means for scanning said beam across the target screen, thereby to produce index signals indicative of the position on the target screen of said scanning beam; means for generating synchronizing signals responsive to the index signals; means for modulating the scanning beam responsive to said synchronizing signals and the data signals to be displayed, into a sequential train of pulses; the improvement comprising means responsive to said scanning means for controlling said modulating means so that pulses of the scanning beam of energy that are to impinge upon the outer regions of the target screen are relatively more narrow than those that are to impinge upon the inner regions of the target screen.

2. The combination of claim 1 wherein the target screen comprises a plurality of strips of different color producing elements disposed substantially at right angles to the scanning direction of the beam of energy.

3. The combination of claim 1 wherein said means for modulating the scanning beam includes pulse modulating means for making the width of individual pulses of the scanning beam proportional to the intensity of the data signal to be displayed.

4. The combination of claim 1 including a cathode ray tube with an envelope and an electron gun, wherein the target screen is mounted within the envelope and the scannable beam of energy is an electron beam provided by the electron gun; including means responsive to the scanning means for focusing the electron beam as a function of its position on the target screen.

5. In a multicolor beam index display system comprising a source of data signals to be displayed in different colors; an image developing target screen with a plurality of strips of color producing and index signal producing elements; means for forming a scannable beam of energy; means for scanning said beam across the target screen, thereby to produce index signals indicative of the position on the target screen of said scanning beam; means for generating a train of sampling pulses from each trigger pulse; means responsive to said sampling pulses and the data signals for providing a train of modulating signals; and means for modulating the scanning beam with said modulating signals; the improvement comprising means responsive to said modulating signals for gating off said means for generating trigger pulses when the residual amplitude of the train of modulating signals exceeds a threshold value.

6. The combination of claim 5 including photomultiplier means responsive to said index signals for generating the trigger pulses, and means connecting the output of the gating off means to said photomultiplier thereby to controllably make it nonamplifying.

7. The combination of claim 5 including a photodetector responsive to said index signals for generating the trigger pulses, amplifier means responsive to the output of said photodetector, and means connecting the output of the gating off means to said amplifier means thereby to controllably make it nonamplifying.

8. The combination of claim 5 wherein the means for generating trigger pulses generally is gated in the off position, including means responsive to selected pulses in said train of sampling pulses for gating on said means for generating trigger pulses.

9. In a beam index color television display apparatus comprising a cathode ray tube with an electron gun including electrical connections thereto and a target screen; index signal deriving means comprising electron-sensitive index radiation emitting indicia on said target screen and means for detecting said index radiation; means responsive to said detection means for generating a train of pulses for controlling the modulation applied to said electron gun; the improvement comprising threshold means with input and output circuits, the input being in circuit with said electrical connections and the output being in circuit with said means for generating a train of pulses, whereby when the signal level on the input circuit exceeds a certain magnitude an output signal is generated which disables said means for generating the train of pulses.

10. In a beam index line-screen color television display apparatus comprising a cathode ray tube with an electron gun for providing an electron beam and a target screen with a plurality of different color emitting striplike elements in register with a plurality of striplike index radiation emitting elements for indicating the position of the electron beam on the target screen; means for scanning the electron beam across the target screen; means for detecting said index radiation thereby to provide index pulses; and trigger pulse means responsive to said index pulses for controlling the excitation of the target screen; the improvement comprising means in said trigger pulse means for differentiating the index pulses to form a first control signal and means for developing a second control signal responsive to the zero-crossing portion of said first control signal.

11. In a beam index multicolor display system comprising:

1. means for developing a scannable beam of energy;
2. means for scanning said beam of energy;
3. a target screen having a plurality of different color-emitting regions disposed for scanning by said beam of energy;
4. said target screen having means associated with said color-emitting regions which provide first index signals in the form of electromagnetic radiation in response to excitation by the scanning beam;
5. index-signal deriving means responsive to said radiation from the target screen for providing second index signals indicative of the position of the beam in the screen;
6. color signal source means;
7. signal processing means, responsive to the color signals and to said second index signals, for modulating the scanning beam into a sequential train of pulses thereby to effectuate proper registry of the pulses of the scanning beam on the different color-emitting regions of the screen; the improvement comprising; and
8. scintillator means in said index-signal deriving means responsive to said first index signals for providing intermediate optical index signals which differ in wavelength distribution from said first index signals.

12. The combination of claim 11 wherein said scintillator means is transmissive of its own scintillations.

13. The combination of claim 12 wherein said scintillator has at least one broad surface, said surface being disposed on the scanning beam side of the target screen.

14. The combination of claim 13 wherein said scintillator has a second surface substantially parallel to said broad surface, including photosensitive means responsive to said optical index signals disposed adjacent to said second surface.

15. The combination of claim 13 wherein said scintillator has a second broad surface and at least one narrow edge, including photosensitive means responsive to said optical index signals disposed adjacent to said edge.

16. The combination of claim 11 including a cathode ray tube with a faceplate which supports the target screen, and an electron gun for furnishing the scannable beam; said target screen providing said first index signals in the form of ultraviolet radiation; and wherein said scintillator means is responsive to said ultraviolet radiation.

17. The combination of claim 16 wherein the cathode ray tube has an envelope with a funnel section, transmissive of said ultraviolet radiation, joined to said faceplate; and wherein said scintillator is disposed externally of the envelope.

18. The combination of claim 17 including an electrically conductive, optically opaque coating on the interior side of said funnel, with at least one window in said coating comprised of a series of spaced apart openings in said opaque coating, thereby to transmit said ultraviolet radiation externally of the envelope without substantially disturbing the electric field within the tube.

19. The combination of claim 11 wherein the first index signals decay at a first rate with a characteristic curve attributed thereto, after its excitation by the scanning beam ceases, and wherein the decay rate of said scintillator means is sufficiently fast to permit the intermediate optical index signals to follow the decay of the first index signals without substantially distorting said characteristic curve.

20. The combination of claim 19 including a cathode ray tube with a faceplate which supports the target screen, and an electron gun for furnishing the scannable beam, wherein the decay rate of said scintillator is faster than the decay rate of said first index signals.

21. The combination of claim 20 wherein said scintillator has a decay time constant of less than 20 nanoseconds.

22. The combination of claim 20 wherein said first index signals radiate in the ultraviolet region of the spectrum; and wherein said scintillator is responsive to the ultraviolet radiation.

23. The combination of claim 22 wherein said scintillator has a decay time constant of less than 10 nanoseconds.

24. In a beam index line-screen color cathode ray tube having an electron gun for furnishing a finely focused beam of electrons; and having a faceplate and a funnel shaped glass envelope joined thereto; and having a target screen mounted on said faceplate with a plurality of index signal emitting strips in register with a plurality of different color-emitting strips, wherein said index strips emit radiation in the optical wavelength range in response to excitation by the electron beam thereby to indicate the position of the beam on the screen; said funnel shaped glass envelope being transmissive of the optical index radiation; a coating of electrically conductive, optically opaque material on the interior surface of the glass envelope; the improvement comprising at least one window in said envelope comprised of a series of closely spaced openings in said coating for transmitting the optical index radiation externally of the tunnel of the envelope without substantially disturbing the electric field within the tube.

25. In a beam index line-screen multicolor display system comprising:

1. means for developing a scannable beam of energy;
2. means for scanning said beam of energy;
3. a target screen having a plurality of different color-emitting striplike regions disposed for scanning in sequence by said beam of energy;
4. said target screen having means associated with said color-emitting striplike regions which provide first index signals in the form of pulses of electromagnetic radiation in response to excitation by the scanning beam;
5. index signal deriving means responsive to said pulses of radiation from the target screen for providing second index signals; indicative of the position of the beam on the screen;
6. color signal source means;
7. signal processing means, responsive to the color signals and to said second index signals, for providing a train of modulating signals;
8. means for modulating the scanning beam with said modulating signals; thereby modulating the scanning beam into a sequential train of pulses which for low intensity color signals have a duration which is less than the time required for the beam to traverse the color-emitting strip with which the pulse is associated, said scanning beam, first index signals, index-signal deriving means, signal processing means, and means for modulating the scanning beam introducing time delays;
9. means for controlling the time delay to effectuate proper registry of the pulses of the scanning beam on the different striplike color-emitting regions of the screen; the improvement comprising; and
10. pulse-shaping means operative on said scanning beam modulating signals for providing trianglelike modulating signals.

26. The combination of claim 25 including means for increasing the amplitude of said trianglelike modulating signals in proportion to the intensity of the color to be displayed to the point where its duration at the base exceeds said time required for scanning, thereby to increase the brightness of the display with acceptable degradation of color purity.

27. The combination of claim 26 including means for converting said trianglelike modulating signal into a trapezoidal-like modulating signals for high brightness color signals.

28. The combination of claim 25 including scintillator means in said signal deriving means responsive to said first index pulses for providing intermediate optical index signals.

29. The combination of claim 28 including means for detecting said optical index signals to provide electrical signals; and means for differentiating said electrical signal.

30. The combination of claim 29 including means for detecting the zero-crossing portion of the differentiated signal.

31. The combination of claim 28 including a cathode ray tube housing the target screen and an electron gun for providing the scannable beam of energy; said target screen comprising means for generating said first index signals in the form of ultraviolet radiation; and wherein said scintillator means is disposed externally of the tube.

32. The combination of claim 31, wherein said scintillator is transmissive of its own radiation, has a broad surface area exposed to said first index signals and a narrow edge; including photodetection means responsive to said own radiation and disposed adjacent said narrow edge to receive the radiation emanating therefrom.